(12) United States Patent
Dimitriou et al.

(10) Patent No.: US 7,328,194 B2
(45) Date of Patent: Feb. 5, 2008

(54) METHOD AND SYSTEM FOR CONDITIONING OF NUMERICAL ALGORITHMS FOR SOLVING OPTIMIZATION PROBLEMS WITHIN A GENETIC FRAMEWORK

(75) Inventors: Labro Dimitriou, Leonia, NJ (US); Michael Dalessio, Madison, NJ (US); Abraham Gulko, East Brunswick, NJ (US); Kurt Ziegler, Trophy Club, TX (US)

(73) Assignee: ASPEED Software Corporation, New York, NY (US)

( * ) Notice: Subject to any disclaimer, the term of this patent is extended or adjusted under 35 U.S.C. 154(b) by 25 days.

(21) Appl. No.: 11/145,151

(22) Filed: Jun. 3, 2005

(65) Prior Publication Data
US 2007/0005521 A1    Jan. 4, 2007

(51) Int. Cl.
*G06N 5/00* (2006.01)
(52) U.S. Cl. .............................. 706/13; 706/12; 706/45
(58) Field of Classification Search .................. 706/13, 706/12, 45; 382/155
See application file for complete search history.

(56) References Cited

U.S. PATENT DOCUMENTS

| | | | | |
|---|---|---|---|---|
| 5,729,623 A | * | 3/1998 | Omatu et al. | 382/155 |
| 5,742,738 A | * | 4/1998 | Koza et al. | 706/13 |
| 5,832,466 A | * | 11/1998 | Feldgajer | 706/13 |
| 5,946,673 A | * | 8/1999 | Francone et al. | 706/13 |
| 6,493,686 B1 | * | 12/2002 | Francone et al. | 706/12 |
| 7,016,882 B2 | * | 3/2006 | Afeyan et al. | 706/13 |

\* cited by examiner

*Primary Examiner*—Wilbert L Starks, Jr.
(74) *Attorney, Agent, or Firm*—McDermott Will & Emery LLP

(57) ABSTRACT

A system for conditioning algorithms to achieve optimum execution time is disclosed. The system defines a computer programmable framework that can be used to efficiently find a global optimization vector. The system provides a precise execution sequencing of operations in order to achieve a speedy conclusion and a genetic receipt for finding the optimal number of siblings (cluster nodes) for the algorithm. The system defines the genetic function for generating an initial population of solution vectors, a condition number for optimal searching of a single vector, a best fit off-springs selection method, and a diversification function.

24 Claims, 3 Drawing Sheets

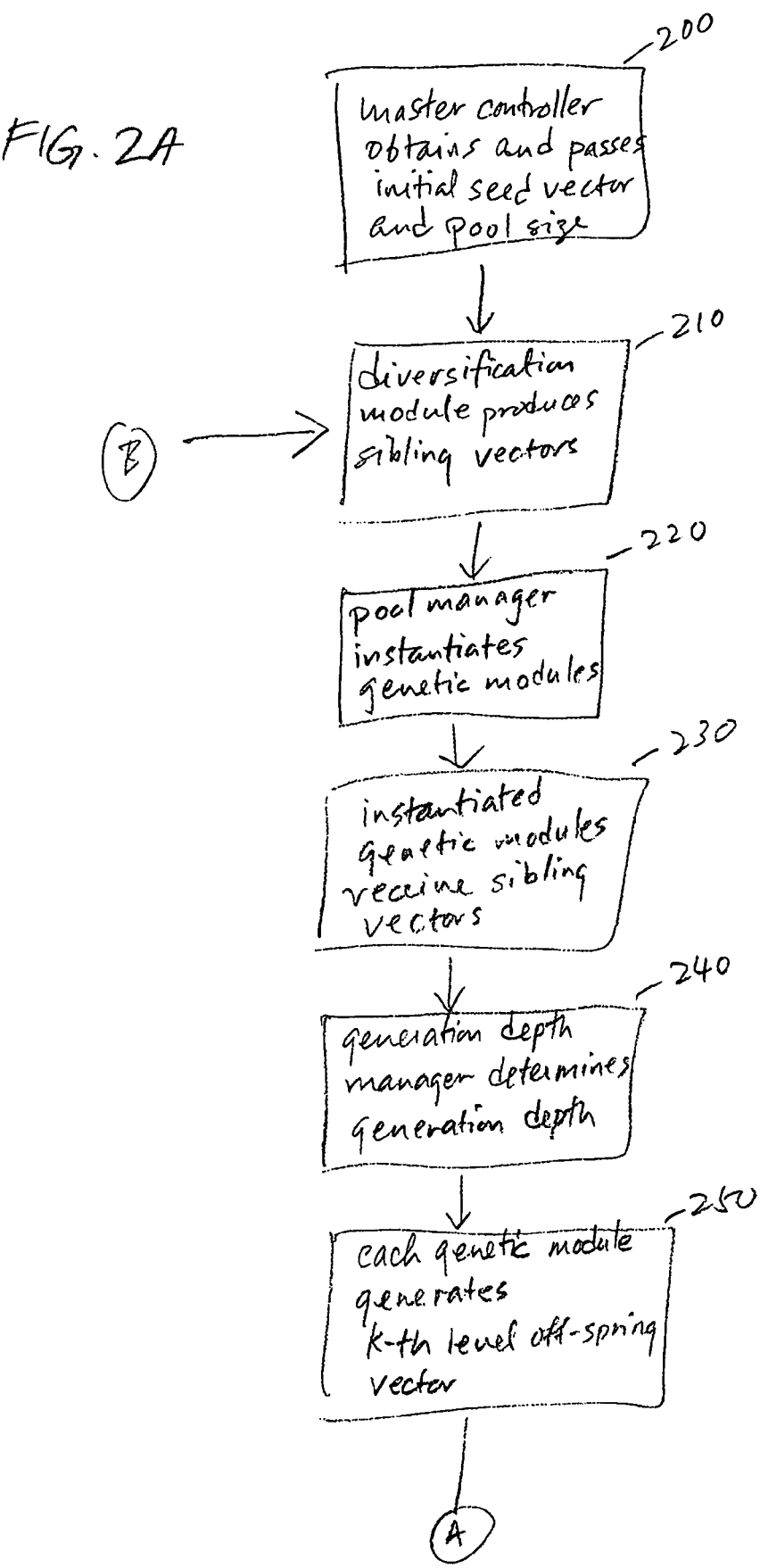

METHOD AND SYSTEM FOR CONDITIONING OF NUMERICAL ALGORITHMS FOR SOLVING OPTIMIZATION PROBLEMS WITHIN A GENETIC FRAMEWORK

BACKGROUND

1. Field

The present invention relates generally to parallel computing, and more specifically, to methods and systems for conditioning an algorithm for parallel execution.

2. Background

Genetic algorithms in programming have existed for quite a long time. Attempts have been made to try to solve real world problems, such as non-linear optimization, with pure genetic algorithms. Pure genetic algorithms include algorithms that create mappings between real world problems to totally stochastic and evolutionary notions. Hybrid algorithms that couple a genetic framework with technical algorithms have also been tried in the past. However, in all cases, the focus of parallel fast execution has been limited to the obvious parallel run of generations. Moreover, it appears that no systematic approach exists in defining the optimal conditions for hybrid collaboration techniques.

Non-linear optimization problems occur in many real-world problems. The mathematical algorithms for solving those problems are typically large and sequential in nature. That means the algorithms start with a first initial estimate vector and provide a mechanism for producing a next vector. Each new vector improves an objective function. In many important real world cases, generating the sequence of vectors or numbers that converge to a solution is a long running process. Such algorithms are usually impossible to parallelize and, consequently, serial computations are the only way to reach a solution. In many cases, large computers may spend days performing computations in order to solve a given problem.

Using genetic algorithms or evolutionary strategies in programming is not a new practice. A genetic algorithm is comprised of a component that produces an initial population of possible solutions, a best fit component that emulates the natural selection process, and a component that emulates the mutation and genetic crossover. The creation of new off-springs and best fit selection continue until the solution cannot be improved any more or the number of generations exceeds some predetermined upper boundary. Historically, such pure genetic algorithms do not yield good solutions and seem to produce results in an aimless manner for a long number of generations.

Hybrid genetic algorithms adapt a pure numerical algorithm to a genetic algorithmic framework. In a way, the pure numerical algorithm defines a target and bounds the scope of the genetic experiment in converging to a solution. Hybrid genetic algorithms may be executed serially but are well suited for parallel computing. Serial hybrid genetic algorithms do not provide any real tangible benefit and are done as academic exercises. On the other hand, executing hybrid genetic algorithms in parallel can provide improvement over other algorithms for many specialized business problems.

Existing hybrid genetic algorithms do not provide a systematic way of defining the genetic parameters that can condition a numerical algorithm to perform optimal in a parallel computational context. Choices, such as number of parallel generations, number of mutations within a generation, and the genetic crossover, have remained experimental and non-deterministic. Seemingly, published crossover techniques all utilize a "wait-to-complete" approach which defeats the optimization effect. This is because, at each genetic stage, a controller needs to wait for all the generations to complete mutations before it can initiate best fit and crossover computations. Existing techniques do not provide guidelines for selecting the optimal number of parallel independent families. It has been observed in most cases that going beyond the optimal number deteriorates performance.

Hence, it would be desirable to provide methods and systems that are capable of conditioning the way numerical algorithms will be executed in a parallel configuration to ensure optimum elapsed time using a genetic framework in an efficient manner.

SUMMARY

The systems and methods of the present invention provide a novel technique where the genetic conditioning of the algorithm happens in real time, is adaptive and dynamic, resulting in optimal and improved performance. In one aspect, the system decides the optimal number of parallel generations. The depth of mutations is not "hard wired" and changes adaptively for optimal results. The number of mutations changes dynamically from generation to generation. The system eliminates the wait-to-complete aspect and evaluates crossover contribution from each off-spring of each family as soon as it becomes available.

In one embodiment, a system for conditioning an algorithm to achieve optimum execution time is provided. The system includes a master controller, a diversification module, a number of genetic modules, a generation depth manager, a best fit evaluator and a convergence manager. The master controller is configured to control operations of the system to manage a life cycle of a genetic process. The diversification module is configured to generate a number of sibling vectors based on an input seed vector. Each genetic module is configured to perform a computational process and generate an off-spring vector based on a corresponding sibling vector received from the diversification module. The genetic modules perform their respective computational processes independently in a parallel manner. The generation depth manager is configured to determine a generation depth for each of the genetic modules. The generation depth is used by the corresponding genetic module to perform its computational process. The best fit evaluator is configured to evaluate an objective function for the off-spring vector generated by each genetic module and generate an objective value. The convergence manager is configured to evaluate the objective value to determine if one or more terminal conditions associated with the objective function have been reached.

In one aspect, a method for conditioning an algorithm to achieve optimum execution time is disclosed. The method includes directing a master controller to provide an initial seed vector and an optimal pool size, directing a diversification module to generate a number of sibling vectors based on an input seed vector, wherein the initial seed vector is initially used as the input seed vector, instantiating a number of genetic modules using the optimal pool size, wherein each genetic module is configured to perform a computational process and generate an off-spring vector based on a corresponding sibling vector received from the diversification module, and wherein the genetic modules perform their respective computational processes independently in a parallel manner, directing a generation depth manager to determine a generation depth for each of the genetic modules, wherein the generation depth is used by the corresponding genetic module to perform its computation process, directing a best fit evaluator to evaluate an objective function for the off-spring vector generated by each genetic module and generate an objective value, and directing a convergence manager to evaluate the objective value to determine if one or more terminal conditions associated with the objective function have been reached.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIGS. 2A and 2B are flow diagrams collectively illustrating the operational flow of an embodiment of the present invention.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
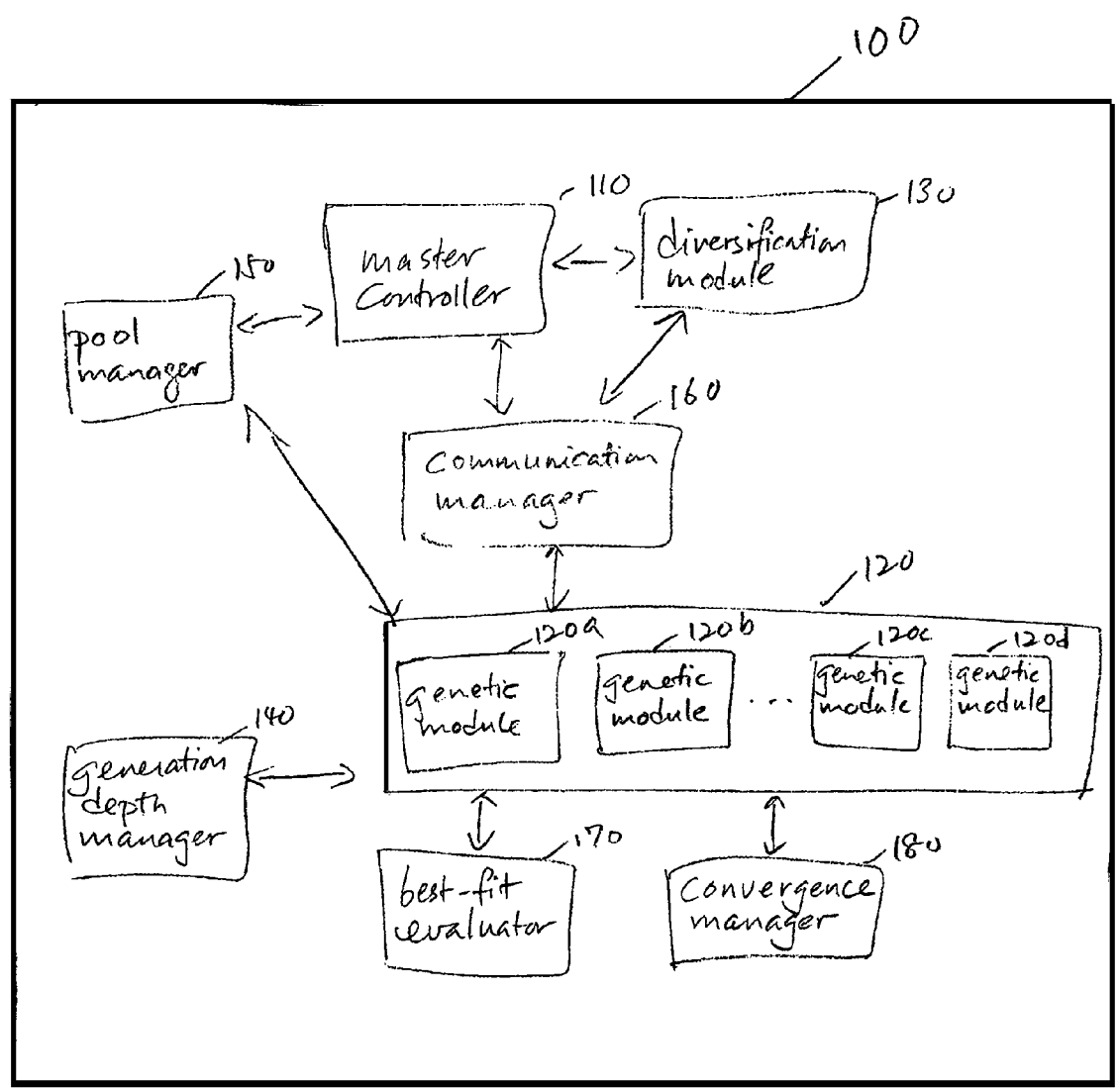
FIG. 1 is a simplified schematic diagram illustrating an embodiment of the present invention.

One or more embodiments of the present invention will now be described. The present invention generally relates to conditioning an algorithm for parallel execution. In one implementation, the conditioning is for a hybrid optimization quasi-Newtonian (non-linear) algorithm using a hybrid genetic framework. Based on the disclosure and teachings provided herein, it should be understood that the present invention may be used with other types of algorithm. FIG. 1 illustrates an embodiment of the present invention. As shown in FIG. 1, a system 100 includes a number of components including a master controller 110, a pool of genetic modules 120, a diversification module 130, a generation depth manager 140, a pool manager 150, a communication manager 160, a best fit evaluator 170 and a convergence manager 180.

The master controller 110 is configured to control and interact with other components of the system 100 in order to manage the life cycle of a genetic process. The genetic process is a process that utilizes past or historical information to generate or derive future results pursuant to some function. The master controller 110 provides an initial seed vector and an optimal genetic pool size.

The diversification module 130 is configured to receive the initial seed vector as input and, in response, produces a number of sibling vectors.

The pool manager 150 is configured to initialize the pool of genetic modules 120. The size of the pool may vary depending on each application. To allow the size of the pool to vary, instances of the genetic modules 120 may be instantiated or eliminated by the pool manager 150. Each of the genetic modules 120 is configured to receive the initial seed vector and, in response, produces a K-generation level off-spring vector, where appropriate.

The generation depth manager 140 is configured to define the optimal K-generation depth for each genetic module 120. The optimal K-generation depth is akin to the number of iterations that a particular genetic module 120 is to perform. As will be further described below, the optimal K-generation depth for each genetic module 120 may vary on a dynamic basis depending on the results produced by that genetic module 120 after each generation or iteration.

The communication manager 160 is configured to facilitate communications between the master controller 110 and the pool of genetic modules 120.

The best fit evaluator 170 is configured to evaluate an objective function for an off-spring vector produced by each of the pool of genetic modules 120. The objective function may be any function that receives one or more variables as input and generates an outcome in response. As part of the evaluation, the best fit evaluator 170 produces a result for the corresponding off-spring vector pursuant to the objective function.

The convergence manager 180 is configured to receive the results produced by the best fit evaluator 170 and evaluates such results. As part of the evaluation, the convergence manager 180 determines whether a result of the objective function falls within an acceptable range or reaches an acceptable value. The convergence manager 180 also maintains historical or archival records of results received from the best fit evaluator 170 to be used in evaluating the current results produced by the best fit evaluator 170. Some of the historical or archival records represent incremental improvement of the objective function. Furthermore, the convergence manager 180 keeps a running tally of the generation levels with respect to the results produced by the best fit evaluator 170.

It should be noted that while the system 100 is identified as having various components, these components are not limited to their respective functionality. The collective functionality of the system 100 may be distributed amongst different component configurations. It should be further noted that the system 100 may be deployed in any type of computational architecture.

Figure 2B:
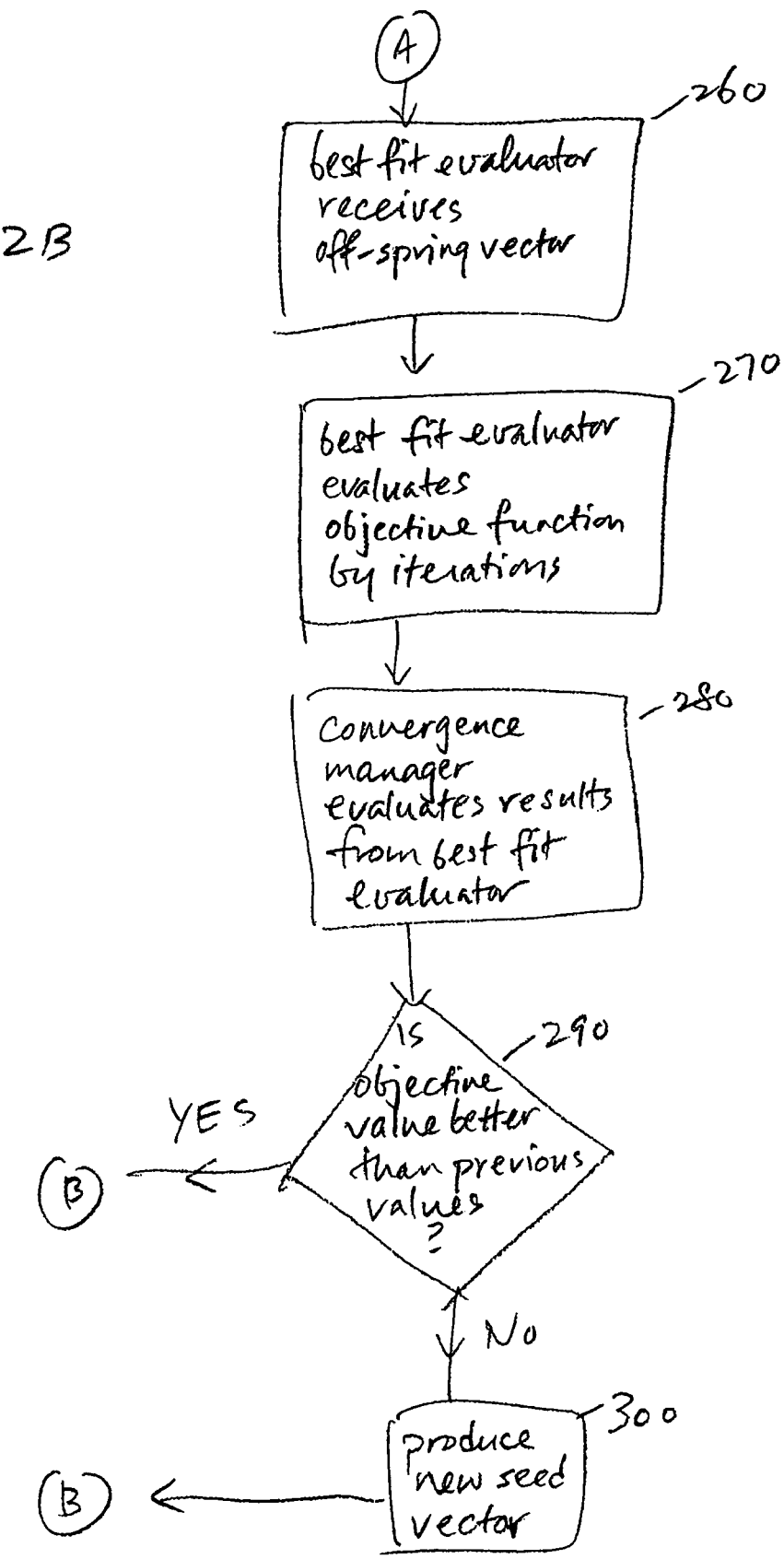

FIGS. 2A and 2B collectively illustrate the general operational flow of the system 100. It should be noted that some of the steps described in connection with the operational flow may be performed serially or in parallel. At block 200, the master controller 110 obtains an initial seed vector and an optimal genetic pool size. The initial seed vector and the optimal genetic pool size may be obtained from one or more components or processes that are external to the system 100. Alternatively, the master controller 110 may compute the initial seed vector and optimal genetic pool size based on information received from one or more external components or processes. The master controller 110 then passes the initial seed vector to the diversification module 130 and the optimal genetic pool size to the pool manager 150 respectively.

At block 210, upon receiving the initial seed vector from the master controller 110, the diversification module 130 uses the initial seed vector to produce an optimal number of sibling vectors. The optimal number of sibling vectors produced by the diversification module 130 may vary depending on each computational scenario. In turn, the diversification module 130 passes the sibling vectors to the communication manager 160.

At block 220, upon receiving the optimal genetic pool size from the master controller 110, the pool manager 150 uses the pool size to initialize or instantiate the appropriate number of genetic modules 120.

At block 230, the communication manager 160 passes the sibling vectors received from the diversification module 130 to the initialized genetic modules, respectively.

At block 240, the generation depth manager 140 determines the appropriate generation depth for each of the genetic modules 120 based at least in part on the corresponding sibling vector. It should be noted that the generation depth for each of the genetic modules 120 may vary. The corresponding generation depths are then provided to the genetic modules 120.

At block 250, each genetic module 120 uses the sibling vector and the generation depth that have been provided respectively by the communication manager 160 and the generation depth manager 140 to produce a K-th level off-spring vector. The K-th level off-spring vector is then passed back to the communication manager 160. It should be noted that each genetic module 120 performs its computations to produce its corresponding K-th level off-spring vector independently. Once the K-th level off-spring vector is computed, the corresponding genetic module 120 forwards it to the communication manager 160 without regard to the progress of the other genetic modules 120.

At block 260, the off-spring vector is relayed from a corresponding genetic module 120 to the master controller 110. The master controller 110, in turn, forwards the off-spring vector to the best fit evaluator 170.

At block 270, the best fit evaluator 170 computes an objective value pursuant to an objective function by performing iterations until the maximum number of iterations have been completed. The maximum number of iterations may vary depending on each application. The best fit evaluator 170 then forwards the objective value to the convergence manager 180.

At block 280, the convergence manager evaluates the objective value and determines if another K-generation needs to be computed, i.e., whether the corresponding genetic module 120 has to generate another K-generation level off-spring vector. To determine whether another K-generation needs to be computed, the convergence manager 180 determines whether the objective value satisfies one or more terminal condition(s) for the objective function. For example, a terminal condition may be reached when the objective value falls within an acceptable range or reaches an acceptable value. If it is determined that another K-generation is not needed (e.g., the objective value falls within an acceptable range or reaches an acceptable value), then the foregoing computational process is terminated. If it is determined that another K-generation is needed, then control is passed to the best fit evaluator 170.

At block 290, the best fit evaluator 170 determines if the objective value is better than previously calculated values. The previously calculated values are obtained from a historical archive. If the objective value is better than previously calculated values, the objective value is stored by the best fit evaluator 170 into the historical archive for subsequent use; furthermore, the corresponding off-spring vector is forwarded to the genetic module 120 and the diversification module 130. The diversification module 130 is now seeded with the off-spring vector as the latest best fit vector.

If it is determined that the objective value is not better than previously calculated values, then at block 300 such determination is relayed to the master controller 110 by the best fit evaluator 170. The master controller 110, in turn, provides a new seed vector to the diversification module 130. The new seed vector may be obtained from an external computation or process. The diversification module 130 then uses this new seed vector as the latest best fit vector.

The diversification module 130 uses its latest best fit vector to generate an optimal number of sibling vectors, as described in block 210, for the next generation. The same computational process is repeated until the convergence manager 180 determines that termination is appropriate as described above.

The following example is a further illustration of the operations of the system 100. In this example, the system 100 is used to compute optimal conditions that are requisite for finding a global optimization vector that minimizes an objective function f(x). The objective function f(x) receives the variable parameter "x" as an input. Initially, the master controller 110 provides an initial seed vector to the diversification module 130 and information relating to the pool size to the pool manager 150.

In response, the diversification module 130 generates an optimal number of sibling vectors, n, where n=4 in this example. The sibling vectors are then forwarded to the communication manager 160. The pool manager 150 also creates a number of instances of genetic modules 120 based on the pool size.

The communication manager 160, in turn, passes the sibling vectors to the genetic modules 120a-d respectively. The generation depth manager 140 determines the appropriate generation depth for each of the genetic modules 120a-d based on the corresponding sibling vector.

Each genetic module 120a-d then independently performs its computations based on its corresponding generation depth and generates its K-th level off-spring vector. Focusing on the genetic module 120a, once the genetic module 120a generates its K-th level off-spring vector, the K-th level off-spring vector is forwarded to the best fit evaluator 170 without regard to the progress of the other genetic modules 120b-d.

In response, the best fit evaluator 170 computes an objective value pursuant to the objective function f(x). The objective value is then forwarded to the convergence manager 180 for further evaluation.

The convergence manager 180 evaluates the objective value and determines if one or more of the terminal condition(s) for the objective function f(x) have been reached. For example, a terminal condition for the objective function f(x) may be reached when the objective value reaches a value of zero ("0") or falls within an acceptable range. If one or more of the terminal condition(s) have been reached, then the computational processes for all the other genetic modules 120b-d are terminated.

On the other hand, if it is determined that none of the terminal condition(s) has been reached, then the best fit evaluator 170 evaluates the objective value to determine if it is better than previously calculated values. If it is determined that the objective value is better than previously calculated values, then the off-spring vector for the genetic module 120a is passed back to the diversification module 130.

The diversification module 130 then uses the off-spring vector to generate an optimal number of sibling vectors for the next generation. The optimal number of sibling vectors for the next generation may or may not be the same as that produced in the previous generation. Also, a new group of genetic modules 120 are instantiated for the next generation. The sibling vectors are then passed to this new group of genetic modules 120 respectively. The generation depth manager Each of the new genetic modules 120 then performs its own computations similar to the genetic module 120a.

As can be seen, a number of genetic modules 120 perform their respective computations in parallel. Furthermore, each genetic module 120 may independently spawn additional genetic module(s) in subsequent generation(s) based on information generated in the previous generation.

The present invention has been applied to PK-PD (Pharmacokinetic and Pharmacodynamic) research by reducing the run times associated with statistical research and validation using the NON Linear Mixed Effects Model referred to as NONMEM and parallelizing the execution of some of the time consuming iterations. This included a demonstration using a commercial software package version of NONMEM from ICON/GloboMax.

Pharmacokinetics is the study of the time course of drug and metabolite levels in different fluids, tissues, and excreta of the body and the mathematical relationships required to develop models to interpret the related data.

Pharmacodynamics is the study of the action of a drug in the body over a period of time including the processes of absorption, distribution, localization in the tissues, biotransformation, and excretion.

Population pharmacokinetics is used to determine mean, variance (or standard deviation) and covariances of PK and PD parameters of a drug within a patient population. Specifically, it is intended to determine (extrapolate) the effect on an individual to more general population (from one to multiple subjects).

Population PK-PD is used because (1) relatively inexpensive information is needed (routine data can be utilized), (2) sparse (incomplete) data can be acceptable, and (3) variances and covariances are more accurate (which is important for Bayesian forecasting). However, population PK-PD's primary disadvantage is that it is expensive in terms of computer time and demands complex statistical methods.

Parameters in the PKPD model are represented as the combination of other parameters that do not vary in the population (fixed effects) and vary in the population (random effects). An example of fixed effects is the mean clearance in the population, or its variance. An example of random effects is the clearance of a particular individual, or rather the deviation of that clearance from the population mean.

Mixed effects model consider both the fixed and random effects. One popular packaged statistical procedure that achieves acceptable results for this problem is Nonlinear Mixed Effect Modeling. This offers a programmatic way to estimate mean, variances and covariances of PKPD parameters from sparse and rich data, delineate the influence of concomitant variables (covariates), e.g. gender, age, disease, on the PKPD parameters, and give a more accurate estimate of the covariances of the parameters and thus of between-subject variability.

NONMEM provides a basic and very general nonlinear regression program that is used for estimating the parameters of nonlinear mixed effects (statistical regression-type) models. Mathematically, the NONMEM model can be characterized as a quasi-deterministic or quasi-Newtonian (deterministic) model. This description is applicable because the solution uses conventional probabilistic sciences which are incapable of giving a deterministic description as Newtonian mechanics do but nevertheless can give a complete description based on a perfect (complete) knowledge of all possible states of the system of interest. In other words, while the state of the system may not be known at any given moment, the state must be at one of the states known for the system over time.

The actual project involved extensive research on the mathematical properties of the quasi-Newtonian approach used by NONMEM. In oversimplified terms, unlike Monte Carlo stochastic approaches to parallelism, the determination of the next number was dependent on a previous calculation; whereas Monte Carlo models are linear such that the calculations can be sliced and run in parallel and the results aggregated. To this point in time, all efforts and approaches to slice the NONMEM model calculation in order to reduce the time with parallel computation had resulted in delivering the results in a longer time.

The foregoing problem is re-examined. A genetic approach is developed to approach the validations using ever converging ranges. This effort resulted in the discovery that for this class of problems, there was a significant response time reduction. In test cases that resulted in as few as slicing the model calculation over 5 parallel instances, the run time could be cut in half. While the characteristic of the parallelism was non-linear (the run time reduction did not directly get reduced by a constant proportion based on the number of slices), there were run time reductions to at least 20 instances. After numerous tests, it was found that the same characteristic was seen independent of the specific algorithmic variables.

Having tested this specific problem for FDA research and testing, it is determined that this genetic approach could be applied to a more general case than just the NONMEM model. As a result, this approach was named a "genetic-quasi-Newtonian" solution for parallelizing quasi-Newtonian problems.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A computer system for conditioning an algorithm to achieve optimum execution time, the system comprising:
    a master controller configured to control operations of the system to manage a life cycle of a genetic process;
    a diversification module configured to generate a plurality of sibling vectors based on an input seed vector;
    a plurality of genetic modules, each genetic module configured to perform a computational process and generate an off-spring vector based on a corresponding sibling vector received from the diversification module, wherein the plurality of genetic modules perform their respective computational processes independently in a parallel manner;
    a generation depth manager configured to determine a generation depth for each of the plurality of genetic modules, wherein the generation depth is used by the corresponding genetic module to perform its computational process;
    a best fit evaluator configured to evaluate an objective function for the off-spring vector generated by each genetic module and generate an objective value; and
    a convergence manager configured to evaluate the objective value to determine if one or more terminal conditions associated with the objective function have been reached.

2. The system of claim 1 further comprising:
    a pool manager configured to manage the plurality of genetic modules and instantiate additional genetic modules, where appropriate.

3. The system of claim 2 wherein, for an off-spring vector associated with a corresponding genetic module, in response to the determination that none of the terminal conditions associated with the objective function has not been reached, the master controller is further configured to direct the diversification module to use the off-spring vector as the input seed vector to generate a new plurality of sibling vectors.

4. The system of claim 3 wherein the pool manager instantiates a new plurality of genetic modules for the new plurality of sibling vectors.

5. The system of claim 4 wherein the generation depth manager defines a new plurality of generation depths for the new plurality of genetic modules.

6. The system of claim 1 further comprising:
    a communication manager configured to facilitate communications between the master controller and the plurality of genetic modules.

7. The system of claim 1 wherein the one or more terminal conditions associated with the objective function include a condition under which the objective value reaches a predetermined value or falls within an acceptable range.

8. The system of claim 1 wherein the convergence manager is further configured to keep a running tally of generation levels associated with each of the plurality of genetic modules.

9. The system of claim 1 wherein the generation depth manager is further configured to determine the generation depth for each of the plurality of genetic module based on the sibling vector associated with the corresponding genetic module.

10. The system of claim 1 wherein the generation depths for the plurality of genetic modules may vary from one another.

11. The system of claim 1 wherein if one or more terminal conditions associated with the objective function have been reached, the master controller is configured to terminate the genetic process by terminating all the computational processes associated with the plurality of genetic modules.

12. The system of claim 1 wherein, for an off-spring vector associated with a corresponding genetic module, in response to the determination that none of the terminal conditions associated with the objective function has not been reached, the best fit evaluator is further configured to determine if the objective value is better than a previously calculated value; and
    wherein in response to the determination that the objective value is not better than the previously calculated value, the master controller is further configured to direct the diversification module to use a new seed vector as the input seed vector to generate a new plurality of sibling vectors, wherein the new seed vector is obtained from an external process or computation.

13. A method performed on a computer system for conditioning an algorithm to achieve optimum execution time, the method comprising:
    directing a master controller to provide an initial seed vector and an optimal pool size;
    directing a diversification module to generate a plurality of sibling vectors based on an input seed vector, wherein the initial seed vector is initially used as the input seed vector;
    instantiating a plurality of genetic modules using the optima pool size, wherein each genetic module is configured to perform a computational process and generate an off-spring vector based on a corresponding sibling vector received from the diversification module, and wherein the plurality of genetic modules perform their respective computational processes independently in a parallel manner;
    directing a generation depth manager to determine a generation depth for each of the plurality of genetic modules, wherein the generation depth is used by the corresponding genetic module to perform its computation process;

directing a best fit evaluator to evaluate an objective function for the off-spring vector generated by each genetic module and generate an objective value; and directing a convergence manager to evaluate the objective value to determine if one or more terminal conditions associated with the objective function have been reached.

14. The method of claim 13 further comprising:
directing a pool manager to manage the plurality of genetic modules and instantiate additional genetic modules, where appropriate.

15. The method of claim 13 further comprising:
for an off-spring vector associated with a corresponding genetic module, in response to the determination that none of the terminal conditions associated with the objective function has not been reached, directing the master controller to cause the diversification module to use the off-spring vector as the input seed vector to generate a new plurality of sibling vectors.

16. The method of claim 15 further comprising:
directing the pool manager to instantiate a new plurality of genetic modules for the new plurality of sibling vectors.

17. The method of claim 16 further comprising:
directing the generation depth manager to define a new plurality of generation depths for the new plurality of genetic modules.

18. The method of claim 13 further comprising:
directing a communication manager to facilitate communications between the master controller and the plurality of genetic modules.

19. The method of claim 13 wherein the one or more terminal conditions associated with the objective function include a condition under which the objective value reaches a predetermined value or falls within an acceptable range.

20. The method of claim 13 further comprising:
directing the convergence manager to keep a running tally of generation levels associated with each of the plurality of genetic modules.

21. The method of claim 13 further comprising:
directing the generation depth manager to determine the generation depth for each of the plurality of genetic module based on the sibling vector associated with the corresponding genetic module.

22. The method of claim 13 wherein the generation depths for the plurality of genetic modules may vary from one another.

23. The method of claim 13 further comprising:
if one or more terminal conditions associated with the objective function have been reached, directing the master controller to terminate the genetic process by terminating all the computational processes associated with the plurality of genetic modules.

24. The method of claim 13 further comprising:
for an off-spring vector associated with a corresponding genetic module, in response to the determination that none of the terminal conditions associated with the objective function has not been reached, directing the best fit evaluator to determine if the objective value is better than a previously calculated value; and in response to the determination that the objective value is not better than the previously calculated value, directing the master controller to cause the diversification module to use the a new seed vector as the input seed vector to generate a new plurality of sibling vectors, wherein the new seed vector is obtained from an external process or computation.

* * * * *